US010915297B1

(12) United States Patent
Halutz et al.

(10) Patent No.: US 10,915,297 B1
(45) Date of Patent: Feb. 9, 2021

(54) HARDWARE ACCELERATOR FOR SYSTOLIC MATRIX MULTIPLICATION

(71) Applicants: Habana Labs Ltd., Caesarea (IL); Shirly Rothschild, Ein-Vered (IL)

(72) Inventors: Ran Halutz, Ramat HaSharon (IL); Tomer Rothschild, Ein-Vered (IL); Ron Shalev, Pardes Hanna-Karkur (IL)

(73) Assignee: HABANA LABS LTD., Caesarea (IL)

( * ) Notice: Subject to any disclaimer, the term of this patent is extended or adjusted under 35 U.S.C. 154(b) by 192 days.

(21) Appl. No.: 16/186,620

(22) Filed: Nov. 12, 2018

Related U.S. Application Data

(60) Provisional application No. 62/586,218, filed on Nov. 15, 2017.

(51) Int. Cl.
*G06F 7/544* (2006.01)
*G06F 15/80* (2006.01)
*G06F 17/16* (2006.01)

(52) U.S. Cl.
CPC ........ *G06F 7/5443* (2013.01); *G06F 15/8046* (2013.01); *G06F 17/16* (2013.01); *G06F 2207/3892* (2013.01)

(58) Field of Classification Search
CPC ...... G06F 7/5443; G06F 17/15; G06F 17/153; G06F 17/16; G06F 15/8046; G06F 2207/3892; G06N 3/06; G06N 3/063

(Continued)

(56) References Cited

U.S. PATENT DOCUMENTS

| 4,760,518 A | 7/1988 | Potash et al. |
| 5,099,447 A | 3/1992 | Myszewski |

(Continued)

FOREIGN PATENT DOCUMENTS

EP 0517241 A2 12/1992

OTHER PUBLICATIONS

Lim et al., "Multidimensional systolic arrays for the implementation of discrete Fourier transforms", IEEE Transactions on Signal Processing, vol. 47, issue 5, pp. 1359-1370, May 1999.

(Continued)

*Primary Examiner* — Andrew Caldwell
*Assistant Examiner* — Emily E Larocque
(74) *Attorney, Agent, or Firm* — Kligler & Associates Patent Attorneys Ltd (57) ABSTRACT

Computational apparatus includes a systolic array of processing elements. In each of a sequence of processing cycles, the processing elements in a first row of the array each receive a respective first plurality of first operands, while the processing elements in a first column of the array each receive a respective second plurality of second operands. Each processing element, except in the first row and first column, receives the respective first and second pluralities of the operands from adjacent processing elements in a preceding row and column of the array. Each processing element multiplies pairs of the first and second operands together to generate multiple respective products, and accumulates the products in accumulators. Synchronization logic loads a succession of first and second vectors of the operands into the array, and upon completion of processing triggers the processing elements to transfer respective data values from the accumulators out of the array.

22 Claims, 6 Drawing Sheets

(58) Field of Classification Search
USPC .......................................................... 708/603
See application file for complete search history.

(56) References Cited

U.S. PATENT DOCUMENTS

| | | | |
|---|---|---|---|
| 5,226,171 | A | 7/1993 | Hall et al. |
| 5,471,627 | A | 11/1995 | Means et al. |
| 6,675,187 | B1* | 1/2004 | Greenberger ............. G06F 1/02 708/622 |
| 7,543,119 | B2 | 6/2009 | Hessel et al. |
| 9,262,165 | B2 | 2/2016 | Hatano et al. |
| 9,647,667 | B1* | 5/2017 | Perry ............... H03K 19/17736 |
| 10,387,122 | B1* | 8/2019 | Olsen ...................... G06F 17/16 |
| 10,685,082 | B2 | 6/2020 | Bekas et al. |
| 2003/0225805 | A1 | 12/2003 | Nash |
| 2006/0095258 | A1 | 5/2006 | Jeong et al. |
| 2007/0143574 | A1 | 6/2007 | Bonebakker et al. |
| 2008/0052693 | A1 | 2/2008 | Archambault et al. |
| 2011/0307459 | A1 | 12/2011 | Jacob (Yaakov) |
| 2014/0181171 | A1 | 6/2014 | Dourbal |
| 2015/0269122 | A1 | 9/2015 | Lang |
| 2017/0147531 | A1 | 5/2017 | Bekas et al. |
| 2017/0255572 | A1 | 9/2017 | Rohe et al. |
| 2017/0344514 | A1 | 11/2017 | Zhou |
| 2018/0074962 | A1 | 3/2018 | Giefers et al. |
| 2018/0074996 | A1* | 3/2018 | Ling ....................... G06F 17/16 |
| 2018/0336163 | A1* | 11/2018 | Phelps ................ G06F 9/30032 |
| 2019/0012295 | A1* | 1/2019 | Yinger .................. G06F 7/5443 |
| 2019/0303743 | A1* | 10/2019 | Venkataramani ..... G06F 9/3834 |

OTHER PUBLICATIONS

Mellott et al., "The Gauss machine: A Galois-enhanced quadratic residue No. system systolic array", Proceedings of IEEE 11th Symposium on Computer Arithmetic, pp. 156-162, Jun. 1993.

Scheiman et al., "A processor-time-minimal schedule for the standard tensor product algorithm", IEEE computer Society, pp. 176-187, year 1994.

U.S. Appl. No. 16/136,294 office action dated Mar. 3, 2020.

U.S. Appl. No. 16/170,069 office action dated Apr. 14, 2020.

Shalev et al., U.S. Appl. No. 15/700,213, filed Sep. 11, 2017.

Shalev et al., U.S. Appl. No. 15/700,207, filed Sep. 11, 2017.

Yang et al., "A Systematic Approach to Blocking Convolutional Neural Networks", Stanford University, arXiv:1606.04209v1 [cs.DC], pp. 1-12, Jun. 14, 2016.

U.S. Appl. No. 15/700,207 office action dated Oct. 1, 2018.

Chetlur et al., "cuDNN: Efficient Primitives for Deep Learning", NVIDIA, Santa Clara, CA, arXiv:1410.0759v3 [cs. NE], pp. 1-9, Dec. 18, 2014.

Suda et al., "Throughput-Optimized OpenCL-based FPGA Accelerator for Large-Scale Convolutional Neural Networks", FPGA '16 Proceedings of the 2016 ACM/SIGDA International Symposium on Field-Programmable Gate Arrays, pp. 16-25, Feb. 21-23, 2016.

Abuzaid et al., "Gaffe con Troll: Shallow Ideas to Speed Up Deep Learning", DanaC'15 Proceedings of the Fourth Workshop on Data analytics in the Cloud, Article No. 2 , 6 pages, May 31-Jun. 4, 2015.

Shalev et al., U.S. Appl. No. 16/136,294, filed Sep. 20, 2018.

Keller, "Computational Foundation of Cognitive Science—Lecture 15: Convolutions and Kernels", School of Informatics, University of Edinburgh, pp. 1-21, Feb. 23, 2010 downloaded from http://www.inf.ed.ac.uk/teaching/courses/cfcs1/lectures/cfcs_l15.pdf.

Wikipedia, "Outer Product", pp. 1-6, May 28, 2020 downloaded from https://en.wikipedia.org/w/index.php?title=Outer_product &oldid=959358295.

Wikipedia, "Matrix Multiplication", pp. 1-14, Jun. 2, 2020 downloaded from https://en.wikipedia.org/w/index.php?title=Matrix_multiplication&oldid=96041746.

U.S. Appl. No. 15/700,213 Office Action dated Jun. 25, 2020.

U.S. Appl. No. 16/170,069 Office Action dated Sep 11, 2020.

* cited by examiner

HARDWARE ACCELERATOR FOR SYSTOLIC MATRIX MULTIPLICATION

CROSS-REFERENCE TO RELATED APPLICATION

This application claims the benefit of U.S. Provisional Patent Application 62/586,218, filed Nov. 15, 2017, which is incorporated herein by reference.

FIELD OF THE INVENTION

The present invention relates generally to computational devices, and specifically to apparatus and methods for high-speed parallel computations.

BACKGROUND

Convolutional neural nets (CNNs) are being used increasingly in complex classification and recognition tasks, such as image classification, object recognition, and automatic speech recognition. Large-scale matrix multiplications are a key component in multi-dimensional tensor convolutions, which are the basic building block of the CNN. For this reason, special-purpose hardware architectures have been proposed for the purpose of parallelizing such matrix multiplications.

Multi-dimensional tensor convolutions are commonly decomposed into multiple outer product computations over pairs of two-dimensional matrices. The outer product (also known as the tensor product or Kronecker product) of two matrices A and B having elements $\{a_{ij}\}$ and $\{b_{ij}\}$, respectively, is written as $C=A\otimes B$, with elements $$c_{ij} = \sum_{p=1}^{m} a_{ip} b_{pj}.$$

Typically, to compute each two-dimensional plane in an output tensor, multiple outer products of this sort are computed and summed together in a sequence of matrix multiply-accumulate operations of the form $C_{out}=C_{in}+A\otimes B$.

SUMMARY

Embodiments of the present invention that are described hereinbelow provide improved apparatus and methods for performing parallel computations over large arrays of data.

There is therefore provided, in accordance with an embodiment of the invention, computational apparatus, including a systolic array of processing elements arranged in a grid of rows and columns. Each processing element includes multipliers and accumulators configured such that in each of a sequence of processing cycles, the processing elements perform the following steps concurrently:

The processing elements in a first row of the array receive a first vector of first operands, such that each of the processing elements in the first row receives a respective first plurality of the first operands, while the processing elements in a first column of the array receive a second vector of second operands, such that each of the processing elements in the first column receives a respective second plurality of the second operands.

Each processing element, except in the first row and first column, receives the respective first and second pluralities of the first and second operands from adjacent processing elements in a preceding row and column of the array, respectively.

Each processing element multiplies pairs of the first and second operands together to generate multiple respective products, and accumulates the products in the accumulators.

Synchronization logic is coupled to load a succession of the first and second vectors into the first row and first column of the array, and upon completion of processing of the succession by the array, to trigger the processing elements to transfer respective data values from the accumulators out of the array.

In some embodiments, the accumulators in each processing element include first accumulators, in which the products are accumulated, and second accumulators. The processing elements are configured to pass stored output data values from the second accumulators to a succeeding processing element along a respective column of the array, to receive new output data values from a preceding processing element along the respective column, and to store the new output data values in the second accumulators. In a disclosed embodiment, the synchronization logic is configured, upon completion of the processing of the succession of the first and second vectors by the array, to trigger the processing elements to transfer the respective data values from the first accumulators to the second accumulators for output from the array by transfer along the respective columns.

Additionally or alternatively, each of the second accumulators in each processing element is coupled to receive and transfer the respective data values that are accumulated in at least two of the first accumulators in the processing element.

In another embodiment, each processing element includes a respective register file, which includes registers that serve as the first and second accumulators and includes write and read ports for writing data to and reading data from the registers.

In some embodiments, the first and second pluralities of the first and second operands each respectively include two of the first operands and two of the second operands, whereby four different pairs of the first and second operands are multiplied together by each processing element. In a disclosed embodiment, each processing elements includes four processing blocks, each of which includes a respective multiplier and one or more of the accumulators and is configured to multiply and accumulate the products of one of the four different pairs of the first and second operands.

In some embodiments, the processing elements are configured to pass the data values that were computed over a first succession of the first and second vectors along the columns of the array for transfer out of the array concurrently with processing the operands in a second succession of the first and second vectors and accumulating the products of the operands in the accumulators. In a disclosed embodiment, each of the first and second successions of the first and second vectors includes a respective pair of matrices to be multiplied together, and the synchronization logic is coupled to receive successive rows and columns of the matrices from a memory and to apply different, respective offsets to successive matrix elements in the received columns and rows of the matrices in order to assemble the succession of the first and second vectors for input to the array. Additionally or alternatively, the processing elements are arranged to compute and output an outer product of each pair of the matrices.

In one embodiment, the apparatus includes a random-access memory (RAM), which is coupled to receive and store the data values that are output successively from the accumulators in an output row of the array over the sequence of processing cycles.

There is also provided, in accordance with an embodiment of the invention, a method for computation, which includes providing a systolic array of processing elements arranged in a grid of rows and columns. Each processing element includes multipliers and accumulators. In each of a sequence of processing cycles, the following steps are performed concurrently:

A first vector of first operands is received in a first row of the array, such that each of the processing elements in the first row receives a respective first plurality of the first operands, and a second vector of second operands is received in a first column of the array, such that each of the processing elements in the first column receives a respective second plurality of the second operands.

Each processing element, except in the first row and first column, receives the respective first and second pluralities of the first and second operands from adjacent processing elements in a preceding row and column of the array, respectively.

The processing elements multiply pairs of the first and second operands together to generate multiple respective products, and accumulate the products in the accumulators.

A succession of the first and second vectors is loaded into the first row and column of the array. Upon completion of processing of the succession by the array, the processing elements are triggered to transfer respective data values from the accumulators out of the array.

The present invention will be more fully understood from the following detailed description of the embodiments thereof, taken together with the drawings in which:

DETAILED DESCRIPTION OF EMBODIMENTS

Overview

Embodiments of the present invention that are described herein provide a novel hardware architecture, which can be applied in efficient computation of matrix multiplication. The architecture is based on a systolic array of processing elements, which perform multiply and accumulate operations in which each processing element multiply together respective pairs of input operands and accumulate products of the multiplication over multiple cycles in order to generate respective output data values. Novel data access logic arranges and loads data for processing by the elements, as well as cumulatively summing the multiplication results with preceding results. This architecture is particularly useful in computing and accumulating outer products of multiple pairs of input matrices—operations of the form $C_{out}=C_{in}+A \otimes B$, as defined above—but can alternatively be used in hardware-based acceleration of other sorts of large-scale computations.

The array of processing elements in the present embodiments is systolic in the following sense: Synchronization logic loads a succession of row vectors into the first row of the array and column vectors into the first column of the array, such that in each processing cycle, the processing elements in a first row of the array receive a first vector of first operands, while the processing elements in a first column of the array receive a second vector of second operands. (The terms "first" and "second" in regard to the operands are used arbitrarily, for the sake of convenience, since the operations carried out by the processing elements in the disclosed embodiments are commutative.) In each processing cycle, each processing element in the array (except in the first row and first column) receives one or more pairs of first and second operands from the adjacent processing elements in the preceding row and column of the array, respectively. The processing elements multiply the first and second operands together and accumulate the products of the multiplications in one or more accumulators. The systolic arrays that are described in the present patent application differ from systolic arrays that are known in the art in that in each processing cycle, each processing element receives and multiplies together multiple pairs of operands, as described in detail hereinbelow.

The successions of first and second vectors that are loaded into the array of processing elements are typically taken from the rows and columns of a pair of matrices that are to be multiplied together. Synchronization logic reads the operand matrices from a memory and arranges the matrix elements in the proper order as vector elements in the first and second vectors so that the matrix elements reach the processing elements in proper synchronization to compute the elements of the outer product. For this purpose, in one embodiment of the invention, the synchronization logic applies different, respective offsets to successive matrix elements in the columns and rows of the operand matrices that it reads from the memory in order to assemble the succession of the first and second vectors for input to the array. Thus, the synchronization logic arranges the elements of one operand matrix into row vectors, which are fed in one at a time from the top of the array of processing elements and passed down through the rows of the array, while arranging the elements of the other operand matrix into column vectors, which are fed in a column at a time from the left side of the array and passed from left to right across the columns of the array.

U.S. patent application Ser. No. 16/136,294, filed Sep. 20, 2018, whose disclosure is incorporated herein by reference, describes a systolic array of this sort in which each processing element receives a single pair of operands in each processing cycle. Assuming matrix A to have C columns, while matrix B has R rows, a total of C+R cycles will be required (at the minimum) for all of the operands to propagate through the entire array, meaning that this systolic array introduces a latency of (at least) C+R cycles into the computational process.

Embodiments of the present invention provide systolic arrays with reduced latency, based on processing elements that are capable of receiving, multiplying, and accumulating the products of multiple pairs of operands in each processing cycle. Thus, for example, a given processing element will receive, in each cycle, the operands $a_{i,j}$ and $a_{i+1,j}$ from matrix A and the operands $b_{m,n}$ and $b_{m,n+1}$ from matrix B, and will simultaneously compute and accumulate the four products: $a_{i,j}b_{m,n}$, $a_{i+1,j}b_{m,n}$, $a_{i,j}b_{m,n+1}$ and $a_{i+1,j}b_{m,n+1}$. Consequently, the processing latency is reduced by half relative to that of arrays in which each processing elements processes only a single pair of operands, at the cost of a small increase in the complexity of the processing elements in the array. Further reductions in latency can be achieved by modifying the processing elements to handle even larger numbers of operands per cycle.

Once all of the elements of the matrices have traversed the entire array, the accumulated data values corresponding to the results of the multiplication will now be stored in a first set of accumulators within each processing element (four accumulators, in the example described above). These results can now be output a row at a time, flowing up or down the columns of the array. (The terms "columns" and "rows" are used arbitrarily, for the sake of convenience, to refer to the two orthogonal axes of the array and could equivalently be interchanged, in which case it would be said that the data values are output a column at a time across the rows of the array.) The results that are output from the array typically represent the elements of the outer product of the pair of matrices, although the array may alternatively be configured to perform other sorts of computations.

For purposes of the output flow of data values, each processing element in the array typically comprises a second set of accumulators. Upon completion of processing of the entire succession of row and column vectors (meaning that the last of the vectors have reached and been operated on by the processing elements in the last row and column of the array), the synchronization logic triggers the processing elements to transfer their accumulated data values from the first set of accumulators to respective accumulators in the second set. At each subsequent processing cycle, the accumulators in the second set pass their stored output data values to the next processing element along the respective columns of the array, and then receive and store new output data values from the preceding processing elements along the respective columns.

For efficient use of processing resources, immediately after the synchronization logic has loaded the last row and column of a first pair of matrices into the array of processing elements, it can begin to feed the successive rows and columns of a new pair of matrices to the array. (If one or both of the matrices are not square, so that the common dimension of the pair of matrices is less than the number of rows in one of the matrices, it may be necessary to delay for a number of processing before starting to feed the next pair of matrices to the array.) The processing elements process the operands in this second succession of vectors and accumulate their products in the first accumulators concurrently—in the same sequence of processing cycles—with passing the stored output data values that were computed over the first succession of vectors through the second accumulators along the columns of the array. Thus, the results of the multiplication of the first pair of matrices are clocked out of the array through the second accumulators, row by row, at the same time as the products of the second pair of matrices are accumulated in the first accumulators. This mode of operation can be repeated over a large succession of matrix pairs.

Alternatively, the same set of (first) accumulators can be used both to multiply and accumulate products of the operands and then to shift the accumulated results out of the array. In this case, however, the array can handle only one pair of matrices at a time, and the overall processing throughput is therefore decreased.

In some embodiments of the present invention, the results of the multiplication are stored in a random-access memory (RAM), which receives the data values that are output successively via the second sets of accumulators from the output row of the array in each processing cycle. (The output row may be, for example, the same first row that receives the row vectors of operands or the last row, depending on the direction of data flow along the columns through the second accumulators.) The RAM is typically configured to accumulate the data values that are computed by the processing elements over multiple pairs of operand matrices, thus generating the cumulative result $C_{out}=C_{in}+A\otimes B$, as explained above. For this purpose, the RAM comprises an array of memory cells that correspond respectively to the array of processing elements, with computational logic coupled to add each of the data values that is output from the array to the accumulated data value that is stored in the corresponding memory cell. This scheme is described in detail in the above-mentioned U.S. patent application Ser. No. 16/136,294. (See particularly FIG. 4 and the description thereof in the specification.)

Alternatively or additionally, the second set of accumulators in each processing element may comprise additional accumulators, for example in the form of a register file, to enable cumulative results such as $C_{out}=C_{in}+A\otimes B$ to be computed internally within the array of processing elements. In this case, the special accumulator RAM that is described above may not be needed, and may be replaced by ordinary memory.

In the embodiments that are described below, each processing element comprises four processing blocks and thus receives and processes two operands from matrix A and two operands from matrix B in each processing cycle. In alternative embodiments (not shown in the figures), each processing element may comprises a larger or smaller number of processing blocks, and may receive and process a larger or smaller number of operands in each processing cycle. These operands may be fed to the processing elements in symmetrical, n×n groups (n=2 in the examples below), or alternatively, in non-symmetrical, n×m groups (n≠m). All such alternative embodiments are considered to be within the scope of the present invention, and their implementation will be apparent to those skilled in the art after reading the present disclosure.

Implementation

Figure 1:
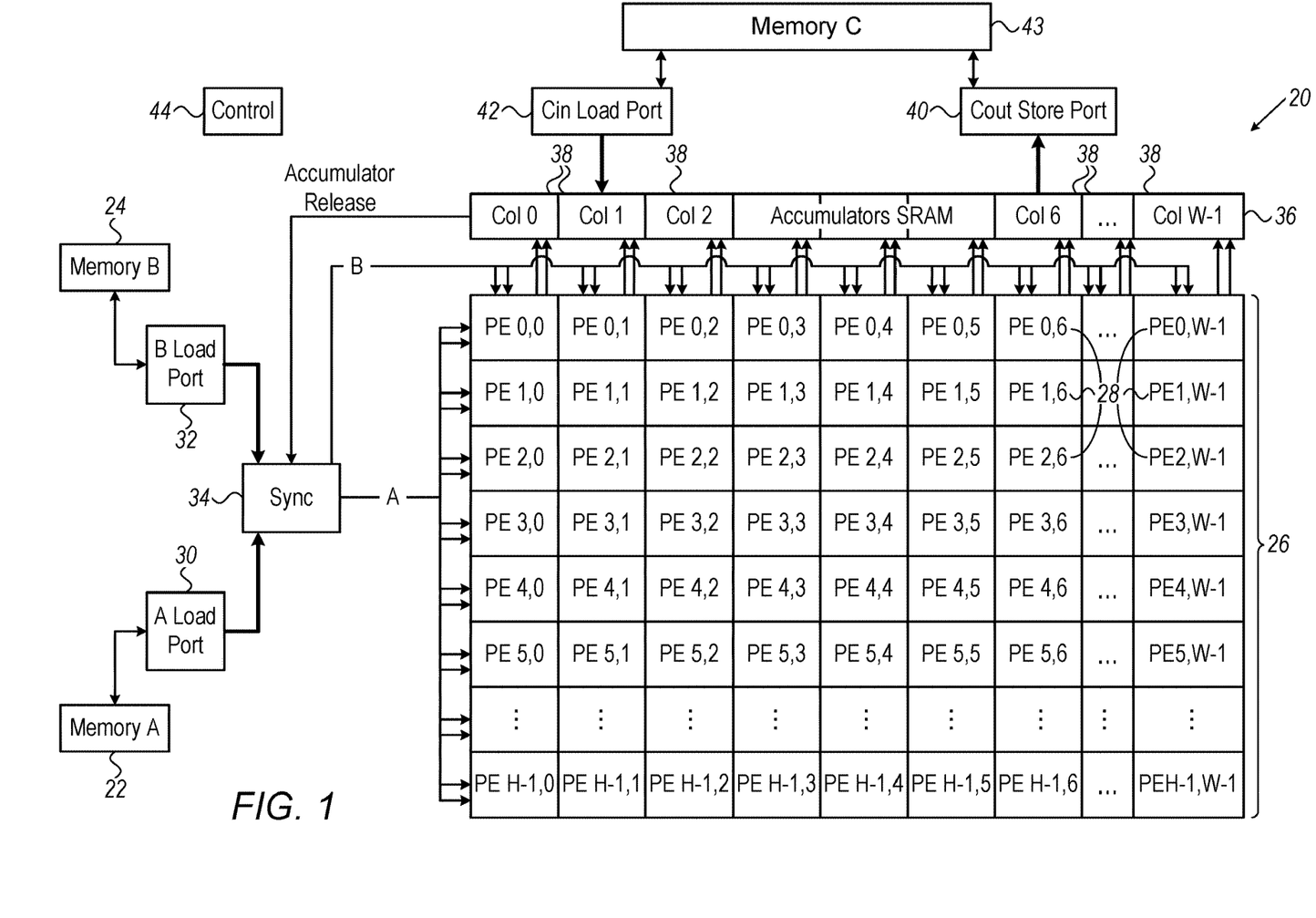
FIG. 1 is a block diagram that schematically illustrates a hardware accelerator for matrix multiplication, in accordance with an embodiment of the invention.

FIG. 1 is a block diagram that schematically illustrates a hardware accelerator 20 for matrix multiplication, in accordance with an embodiment of the invention. Accelerator 20 comprises a systolic array 26 of processing elements 28, which are arranged in a grid of H rows and W columns. Accelerator 20 is typically implemented in hardware logic, which may be hard-wired or programmable, in a single integrated circuit chip. Alternatively, the components of accelerator 20 may be partitioned among two or more chips and may include standard components, such as a programmable processor and/or memory.

Accelerator 20 operates on matrices A and B of operands, which are stored respectively in memories 22 and 24 and then multiplied together in array 26. Typically, memories 22 and 24 are separate from accelerator 20 and may simply comprise regions allocated within the system memory of a computing system in which the accelerator is installed.

Synchronization logic 34 loads a succession of vectors into the first column and first row of array 26 from memories 22 and 24 via load ports 30 and 32, respectively. Typically, a new vector can be loaded from each load port in each processing cycle of the array. For this purpose, each load port 30, 32 receives a descriptor of its operand matrix, which contains the base address of the matrix in memory 22, 24, and possibly the size and stride of the vectors to be read from the input matrices, as well as the size (in bytes) of the matrix elements. The "stride" is defined as the address difference between each two consecutive elements in the same dimension of a given matrix that are to be loaded by the load port, while the "size" is the number of valid elements in a dimension of a given matrix.

When load ports 30, 32 receive a valid descriptor, they start fetching the vectors of matrix elements from memories 22, 24 that are specified by the descriptor. The load ports push these vectors to synchronization logic 34, which delivers the elements of matrix A as operands to processing elements 28 in the first column of array 26 (labeled PE 0,0; PE 1,0; . . . ; PE H−1,0), and delivers the elements of matrix B as operands to processing elements 28 in the first row of the array (labeled PE 0,0; PE 0,1; . . . ; PE 0,W−1). As indicated by the arrows directed to the first column and first row of processing elements 28, each processing element in the first column receives two elements of vector A in each cycle; and each processing element in the first row receives two elements of vector B. Thus, the vectors that are input to the first column and row of processing elements in each cycle have respective lengths 2H and 2 W.

On the basis of this data scheme, each processing element 28 multiplies two pairs of scalar operands in each processing cycle: two elements "a" of matrix A, and two elements "b" of matrix B. Each processing element then passes its two "a" operands to the next processing element along its row and passes its two "b" operands to the next processing element in its column. At each processing cycle, the products of these multiplications are summed with the previous products in a set of accumulators in each processing element. As a result, after all the elements of matrices A and B have traversed array 26, each processing element 28 holds four respective matrix elements of the outer product A⊗B. Further details of the structure and operation of processing elements 28 are described hereinbelow with reference to FIG. 2.

Figure 2:
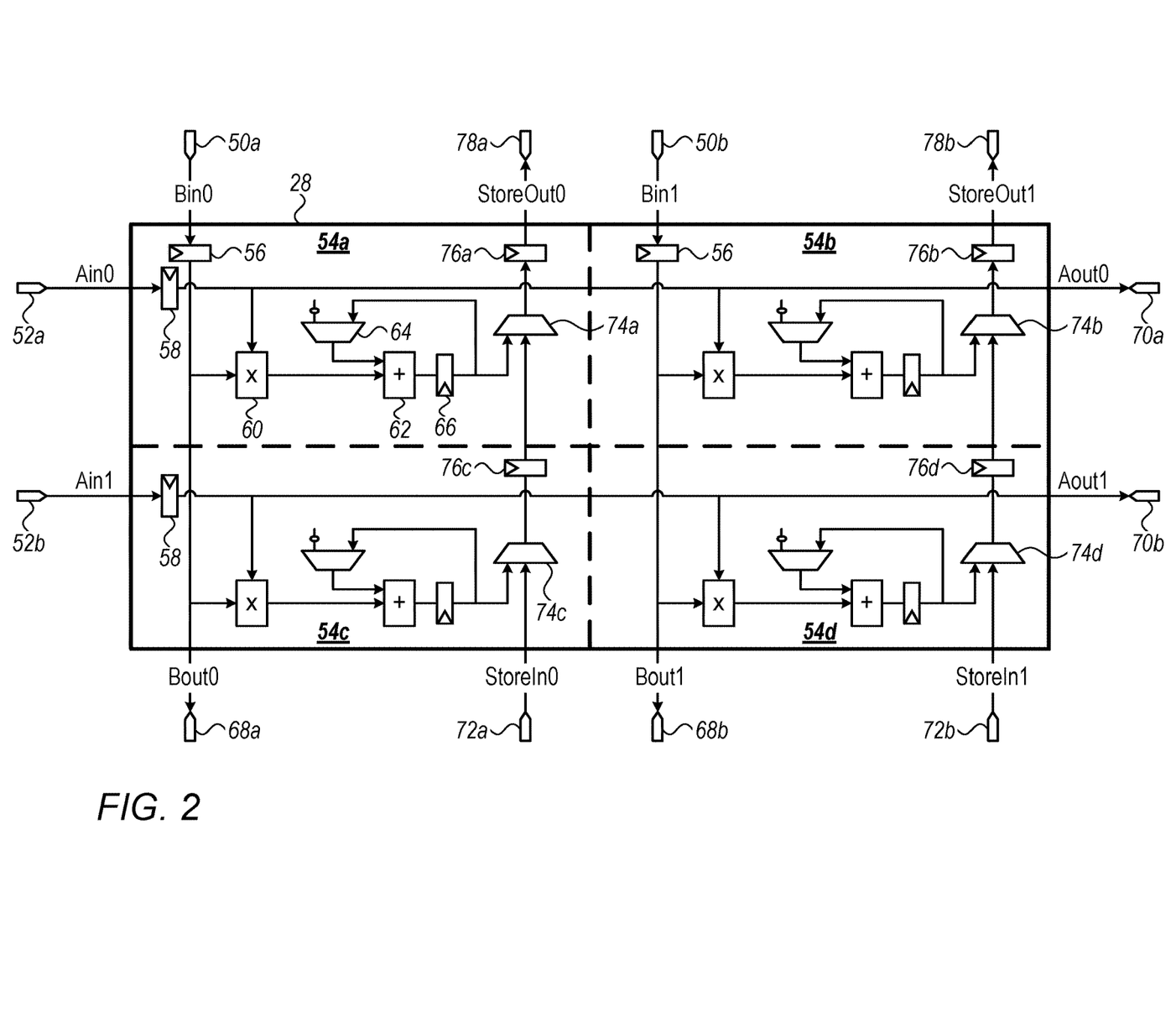
FIG. 2 is a block diagram that schematically shows details of a processing element, in accordance with an embodiment of the invention.

Upon completion of processing by array 26 of the entire successions of vectors making up matrices A and B, synchronization logic 34 triggers processing elements 28 to transfer the respective output data values from the accumulators to shift registers for readout from array 26. These shift registers are implemented as chains of additional accumulators, two in each processing element, which are also shown in FIG. 2. Loading and multiplication of a new pair of matrices by load ports 30 and 32 can then start immediately, concurrently with shifting the output data values out of array 26.

In the embodiment shown in FIG. 1, the two shift registers in processing elements 28 of each column of array 26 pass the output data values up the respective column. In each processing cycle, each processing element 28 passes its stored output data values to the next processing element up the column of the array and receives and stores new output data values from the preceding processing element below it in the column. In each cycle, the processing elements in the top row of array 26 (PE 0,0; PE 0,1; . . . ; PE 0,W−1) shift out a row of 2 W data values of the output matrix to a RAM accumulator 36, which receives and stores the data values that are output from the array.

RAM accumulator 36 comprises an array of accumulator units 38, each comprising a matrix of memory cells and computational logic, as described in the above-mentioned U.S. patent application Ser. No. 16/136,294. The memory cells typically comprise static RAM (SRAM), although other sorts of memory may alternatively be used. In the pictured embodiment, each column of array 26 feeds its output data values to a corresponding accumulator unit 38 of RAM accumulator 36. Depending on the computational task at hand, the computational logic is able to sum together the results of multiplication of multiple pairs of operand matrices and accumulate these sums in the RAM, using read-add-write operations. Additionally or alternatively, RAM accumulator 36 can receive an input matrix Cin from a memory 43 via a load port 42 and then sums the output data values from array 26 with Cin. Memory 43 may be a part of the system memory, for example, or a separate, dedicated memory.

RAM accumulator 36 outputs the data values that are stored in the RAM as a matrix Cout through a store port 40 to memory 43. Store port 40 and load port 42 typically carry out their functions in response to store and load descriptors, which indicate the source and destination base addresses and ranges of data to be written. A system controller 44, such as a suitable microprocessor, prepares and delivers the descriptors to store and load ports 40 and 42, as well as to load ports 30 and 32, typically under control of suitable software instructions.

RAM accumulator 36 outputs an accumulator release signal to synchronization logic 34 when it is ready to receive data from array 26. (This release may be delayed, for example, while awaiting completion of the input or output of data to the RAM accumulator via load port 42 or store port 40.) To avoid backpressure on processing elements 28, synchronization logic 34 will delay the release of the last vectors to multiply and the associated "rollup" indication until there is sufficient capacity available in RAM accumulator 36 to receive the new data values.

FIG. 2 is a block diagram that schematically shows details of one of processing elements 28, in accordance with an embodiment of the invention. Processing element 28 comprises four processing blocks 54a, 54b, 54c and 54d (referred to collectively as processing blocks 54), which operate simultaneously on respective pairs of operands, as explained above.

In each processing cycle, input terminals 50a and 50b receive respective input operand values Bin0 and Bin1 (referred to collectively as $Bin_j$) from the adjacent processing elements in the preceding row of array 26, respectively; while input terminals 52a and 52b, receive respective input operand values Ain0 and Ain1 (referred to collectively as $Ain_i$) from the adjacent processing elements in the preceding column. The input operand values may be held for one processing cycle in input registers 56 and 58. These same operand values are output via output terminals 68a, 68b, 70a and 70b to the input terminals of the adjacent processing elements in the next row and column of array 26, where they will serve as the operand values in the next processing cycle.

Within each processing block 54, a respective multiplier 60 multiplies the respective pair of operands $Ain_i$ and $Bin_j$ together to generate a product, which is summed by an adder 62 and stored in a first accumulator 66. At the beginning of a cycle of multiplication of a new pair of input matrices (which can be triggered by a signal from synchronization logic 34), a multiplexer 64 inputs zero to adder 62, thereby initializing accumulator 66. In each cycle thereafter, the multiplexer inputs the current value in accumulator 66 to adder 62, to be summed with the product of multiplier 60.

Upon the last multiplication of a column of matrix A by a row of matrix B, synchronization logic 34 signals multiplexers 74a, 74b, 74c and 74d (referred to collectively as multiplexers 74) to transfer the data values that are stored in accumulators 66 into a second set of accumulators 76a, 76b, 76c and 76d, respectively (referred to collectively as accumulators 76). The same synchronization signal can be applied to both multiplexers 64 and 74. In the next processing cycle, the output data values that are now stored in accumulators 76 will be passed up the chain, with the values in accumulators 76a and 76b passed via store output terminals 78a and 78b to the next processing element 28 along the respective column of array 26; and the values in accumulators 76c and 76d passed via multiplexers 74a and 74b to accumulators 76a and 76b, respectively. Accumulators 74c and 74d will then receive and store new output data value, via store input terminals 72a and 72b, respectively, from the store output terminals of the preceding processing element 28 along the respective column.

Accumulators 76 thus serve as stages in shift registers, through which all of the data values that were stored in accumulators 66 are now read out of array 26 to RAM accumulator 36. As noted earlier, this readout can be performed concurrently, i.e., in the same processing cycles, with the multiplication of the operands and accumulation of the data values in the product of the next pair of matrices.

Figure 3:
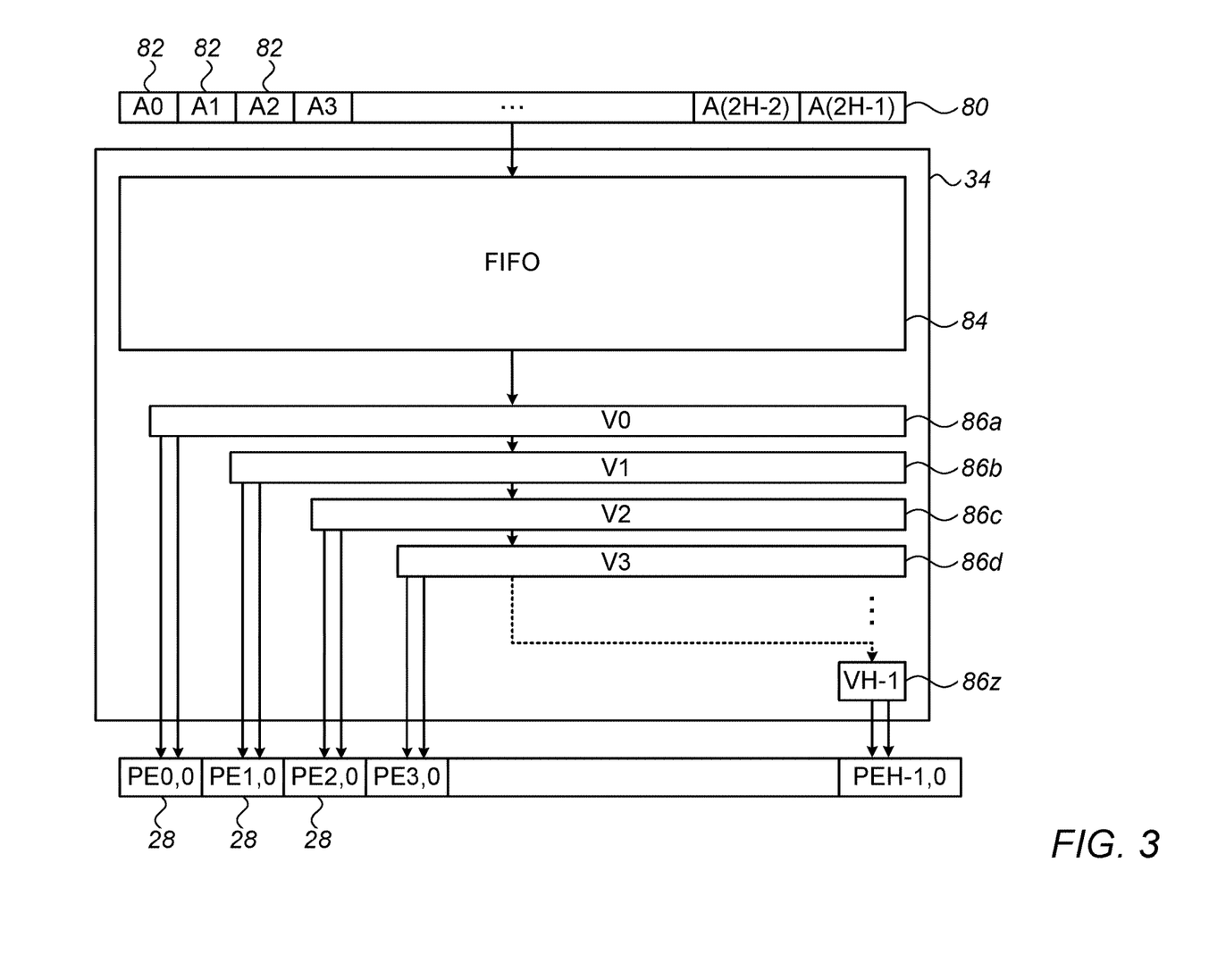
FIG. 3 is a block diagram that schematically shows details of synchronization logic, in accordance with an embodiment of the invention.

FIG. 3 is a block diagram that schematically shows details of synchronization logic 34, in accordance with an embodiment of the invention. For the sake of simplicity, FIG. 3 shows only the operation of the synchronization logic on the columns of matrix A, which are loaded via load port 30 and used to feed processing elements 28 in the first column of array 26. Synchronization logic 34 operates on similar fashion on the rows of matrix B, which are loaded via load port 32 and used in feeding the first row of array 26.

Synchronization logic 34 receives successive columns 80 of elements 82 of matrix A from memory 22 and applies different, respective offsets to the matrix elements in successive rows of the matrix in order to assemble the succession of column vectors that are input to the first column of array 26. In the pictured embodiment, column 80 comprises 2H matrix elements 80, which will feed the H processing elements 28 in the first column of array 26. Synchronization logic 34 receives columns 80 in a first-in-first-out (FIFO) memory 84, which may be used to compensate for latencies in other branches of the data path in accelerator 20.

Each column 80 is then passed through a sequence of delay registers 86a, 86b, 86c, . . . , 86z (referred to collectively as delay registers 86), of successively decreasing widths. The delay registers are labeled V0, V1, V2, V3, . . . , VH−1, and correspond to the H rows of array 26, as shown in FIG. 1. At each processing cycle, the values in the first two cells in each delay register 86 are passed to the corresponding processing element 28 in the first column of array 26, while the remaining values are passed to the corresponding cells in the next delay register. In other words, the values A0 and A1 in the first cell of V0 are passed to PE0,0; the values A2 and A3 in the second cell of V1 are passed to PE1,0; and so forth up to the single cell in VH−1, which is passed to PE(H−1,0).

Thus, the column vector that is output by synchronization logic 34 in each processing cycle is actually made up elements taken from different columns of matrix A, due to the different offsets applied by the successive delay registers 86. These offsets ensure that the matrix elements will traverse array 26 in proper synchronization to compute the outer product A⊗B.

Because of the offsets, when a new matrix (or pair of operand matrices) is loaded into synchronization logic 34, initially not all of the elements in the corresponding vectors that are output from the synchronization logic to array 26 will be valid. (For example, in the first cycle, only the first two elements in each vector will be valid, followed by four elements in the next cycle, and so forth.) To deal with this situation, the vector elements may include, along with the data, a "valid" flag, which synchronization logic 34 sets to mark the vector elements that are valid. Processing elements 28 check the valid flag in the vector elements that they receive and accordingly multiply and accumulate the data in the vector elements only when the flag is set.

Figure 4:
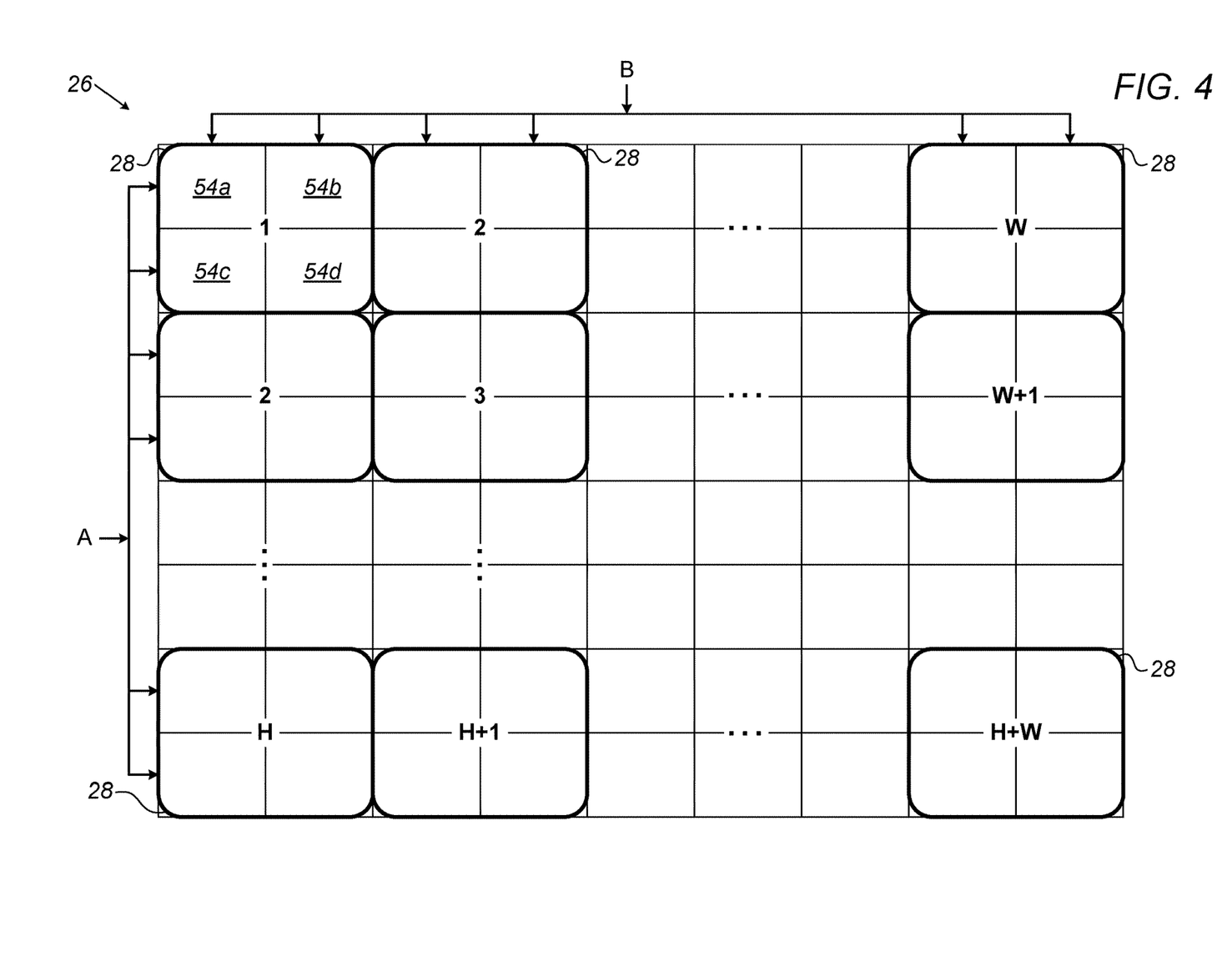
FIG. 4 is a block diagram that schematically illustrates systolic propagation of operands through an array of processing elements, in accordance with an embodiment of the invention.

FIG. 4 is a block diagram that schematically illustrates systolic propagation of operands through array of processing elements 28, in accordance with an embodiment of the invention. The pattern of propagation shown in this figure is the outcome of the design of the processing elements and of synchronization logic 34, as described above with reference to FIGS. 2 and 3.

Processing elements 28 are marked with ordinal numbers (1, 2, 3, . . . , H+W) to indicate the processing cycle at which each element will first receive pairs of valid operands from both of matrices A and B. Thus, in the first cycle, synchronization logic 34 will feed $\{A_{0,0}, A_{1,0}\}$ and $\{B_{0,0}, B_{0,1}\}$ to PE0,0, and each processing block 54 in PE0,0 will multiply and accumulate one respective pair of these matrix elements. In the second cycle, $\{A_{0,0}, A_{1,0}\}$ will propagate to the right to PE0,1, while $\{B_{0,0}, B_{0,1}\}$ propagate down to P1,0, to be multiplied by new pairs of operands input by synchronization logic 34. This process continues through H+W cycles, at which point the first pairs of valid operands reach PE(H−1,W−1). By contrast, in the above-mentioned U.S. patent application Ser. No. 16/136,294, 2(H+W) cycles will be required for propagation of the same number of operands through the array.

Alternative Embodiment

Figure 5:
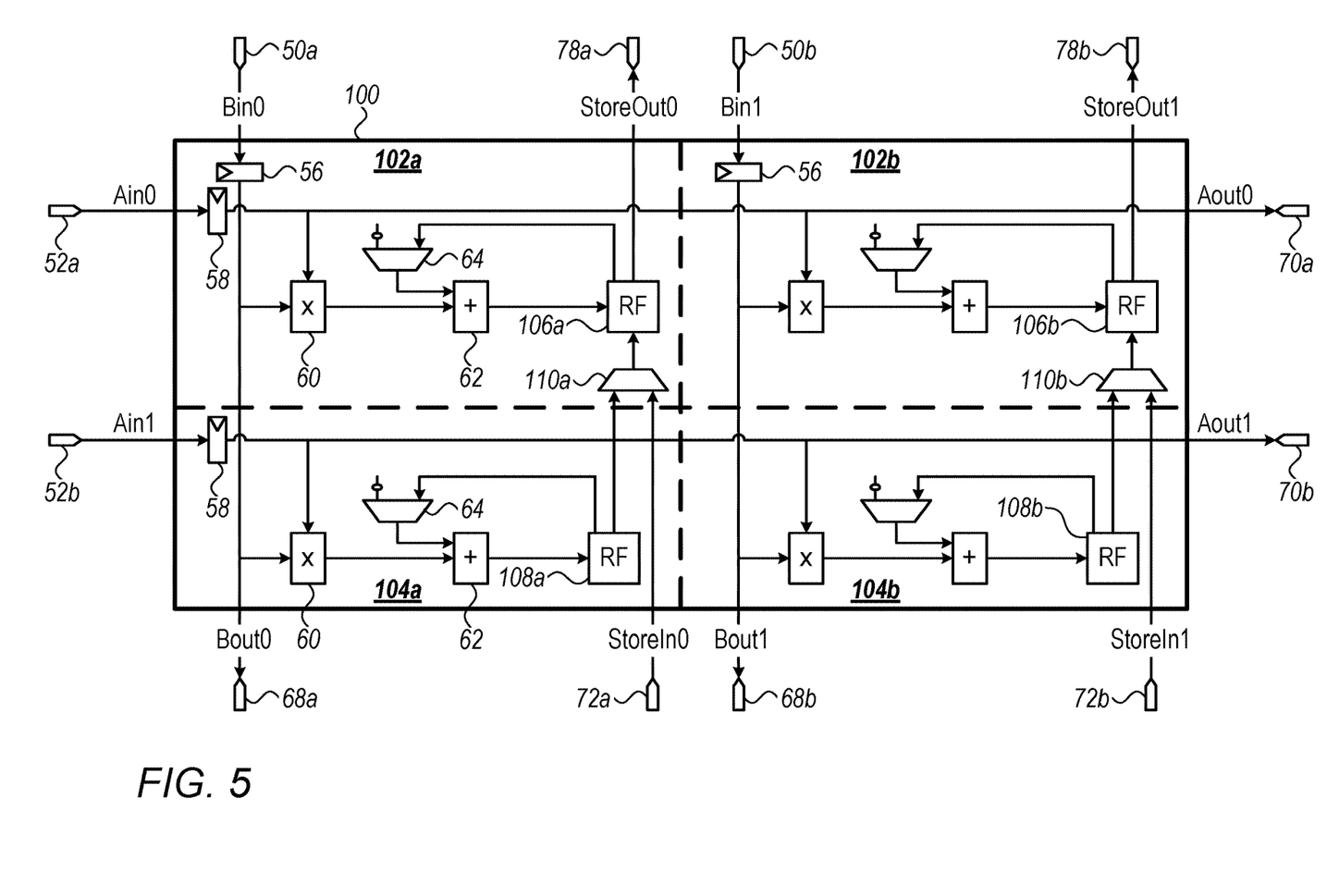
FIG. 5 is a block diagram that schematically shows details of a processing element, in accordance with another embodiment of the invention.

FIG. 5 is a block diagram that schematically shows details of a processing element 100, in accordance with another embodiment of the invention. Processing elements 100 of this type can replace processing elements 28 in array 26; and components of processing elements 100 that operate in a similar fashion to the corresponding components in processing elements 28 are labeled with the same indicator numbers.

Processing elements 100 differ from processing elements 28 in that processing elements 100 contain additional accumulators, in the form of registers along with read and write logic, which are organized in the present embodiment in register files 106 and 108. These register files can thus not only perform the accumulation and shift register functions of registers 66 and 76 in processing elements 28, as described above, but can also hold partial results while processing elements 100 are performing other computations. For example, one of the registers in each of register files 106 and 108 can hold the results of a previous outer product computation, while computation of another outer product is in process. Processing elements 100 can then add the results of such computations together in order to perform computations of the form $C_{out}=C_{in}+A \otimes B$ within the array, rather than relying on an external RAM accumulator as in the preceding embodiment. Thus, although processing elements 100 are larger and more complex and consume more electrical power than processing elements 28, they increase the capabilities and versatility of array 26.

In the example shown in FIG. 5, each processing element 100 comprises two "upper" processing blocks 102a and 102b (referred to collectively as processing blocks 102) and two "lower" processing blocks 104a and 104b (collectively processing blocks 104). In one embodiment (not shown in the figures), all four processing blocks could contain identical register files. In the present embodiment, however, processing blocks 102a and 102b contain respective register files 106a and 106b (collectively register files 106), while processing blocks 104a and 104b contain respective register files 108a and 108b (collectively register files 108). Register files 106a and 106b differ from register files 108a and 108b in having additional write ports, which are fed by respective multiplexers 110a and 110b (collectively multiplexers 110), and may possibly contain one or more additional registers, as well. This design facilitates efficient readout of computational results from the array of processing elements, as described below.

Figure 6:
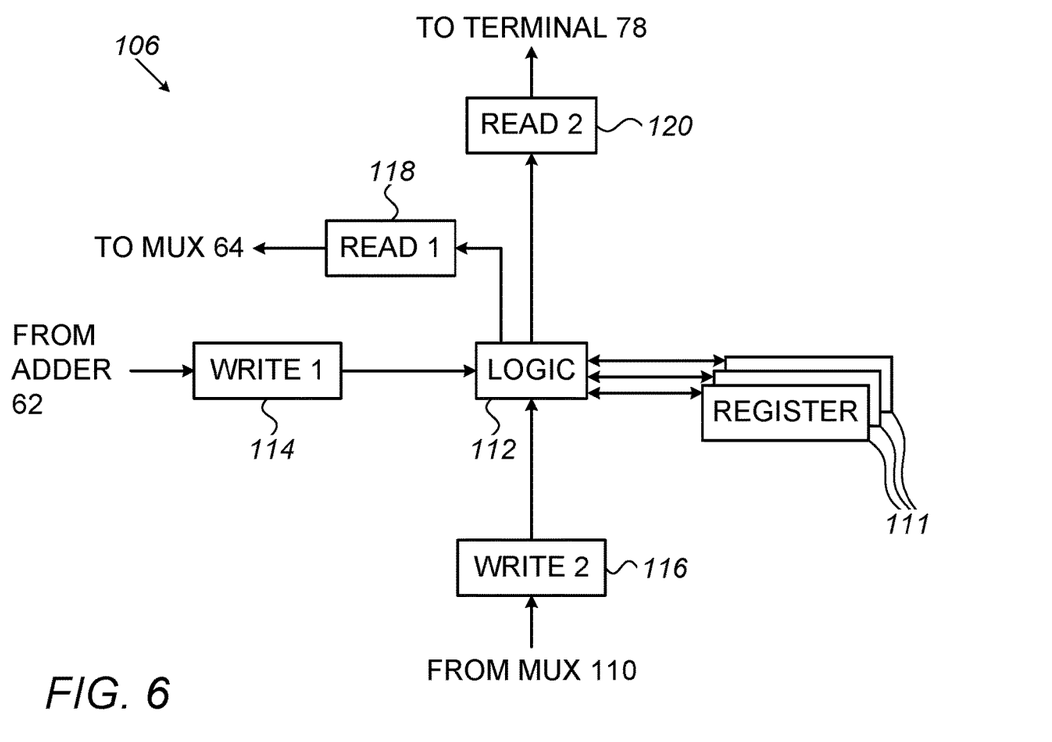
FIG. 6 is a block diagram showing details of a register file, in accordance with an embodiment of the invention.

FIG. 6 is a block diagram showing details of register file 106, in accordance with an embodiment of the invention. Register file 106 comprises multiple registers 111 (typically at least three registers), which are connected by logic 112 to receive input data from write ports 114 and 116 and to output stored data via read ports 118 and 120. Register files 108 are similar in design, but without write port 116. Logic 112 connects one or more of registers 111 to output partial results via read port 118 to adder 62 and then to receive and store sums from the adder via write port 114, similarly to accumulators 66. Logic 112 connects another register 111 to receive stored results through read port 116 from register file 108 via multiplexer 110 and to shift the results up the column of array 26 through write port 120.

Referring back now to FIG. 5, for purposes of shift register operation, multiplexers 110 first transfer the values stored in register files 108 to the corresponding register files 106, and subsequently transfer values via input terminals 72 from register files 106 of the next processing element 100 down the column of array 26. For example, processing elements 100 may shift values up the columns of the array as follows:

First Cycle:
Register file 106 in PE0 (top row of the array) shifts data up (out to RAM).
Register file 108 in PE0 shifts data to register file 106 in PE0 via multiplexer 110.

Second Cycle:
Register file 106 in PE0 (top row of the array) shifts data up (out to RAM).
Register file 106 in PE1 (second row of the array) shifts data up to register file 106 of PE0.
Register file 108 in PE1 shifts data to register file 106 in PE1 via multiplexer 110.

Third Cycle:
Register file 106 in PE0 (top row of the array) shifts data up (out to RAM).
Register file 106 in PE1 (second row of the array) shifts data up to register file 106 of PE0.
Register file 106 in PE2 (third row of the array) shifts data up to register file 106 of PE1.
Register file 108 in PE2 shifts data to register file 106 in PE2 via multiplexer 110.

This process continues until all the data have been shifted out to RAM. The "rolling transfer" of the contents of registers files 106 and 108 in this manner facilitates efficient transfer of data out of array 26, in synchronization with the systolic transfer of operands through the array.

As noted earlier, although the embodiments described above provide processing elements with four processing blocks, and thus process simultaneously four pairs of operands in each cycle, the principles of the present invention may similarly be applied, mutatis mutandis, in creating systolic arrays in which each processing element handles a larger or smaller number of operands per cycle. Such processing elements may be configured to handle not only symmetrical, n×n groups of operands (meaning n operands from matrix A and n operands from matrix B, wherein n=2 in the above examples), but also non-symmetrical, n×m groups. All such alternative embodiments are considered to be within the scope of the present invention.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. Computational apparatus, comprising:
a systolic array of processing elements arranged in a grid of rows and columns, each processing element comprising multipliers and accumulators configured such that in each of a sequence of processing cycles, the processing elements perform the following steps concurrently:
the processing elements in a first row of the systolic array receive a first vector of first operands, such that each of the processing elements in the first row receives a respective first plurality of the first operands, while the processing elements in a first column of the systolic array receive a second vector of second operands, such that each of the processing elements in the first column receives a respective second plurality of the second operands;
each processing element, except in the first row and first column, receives the respective first and second pluralities of the first and second operands from adjacent processing elements in a preceding row and column of the systolic array, respectively; and
each processing element multiplies pairs of the first and second operands together to generate multiple respective products, and accumulates the products in the accumulators; and
synchronization logic, which is coupled to load a succession of the first and second vectors into the first row and first column of the systolic array, and upon completion of processing of the succession by the systolic array, to trigger the processing elements to transfer respective data values from the accumulators out of the systolic array,
wherein the processing elements are configured to pass the data values that were computed over a first succession of the first and second vectors along the columns of the systolic array for transfer out of the systolic array concurrently with processing the operands in a second succession of the first and second vectors and accumulating the products of the operands in the accumulators.

2. The apparatus according to claim 1, wherein the accumulators in each processing element comprise first accumulators, in which the products are accumulated, and second accumulators, wherein the processing elements are configured to pass stored output data values from the second accumulators to a succeeding processing element along a respective column of the systolic array, to receive new output data values from a preceding processing element along the respective column, and to store the new output data values in the second accumulators.

3. The apparatus according to claim 1, wherein the first and second pluralities of the first and second operands each respectively comprise two of the first operands and two of the second operands, whereby four different pairs of the first and second operands are multiplied together by each processing element.

4. The apparatus according to claim 1, wherein each of the first and second successions of the first and second vectors comprises a respective pair of matrices to be multiplied together.

5. The apparatus according to claim 4, wherein the pair of the matrices comprises a first matrix and a second matrix, and wherein the synchronization logic is coupled to receive successive rows of the first matrix and columns of the second matrix from a memory and to apply different, respective offsets to successive matrix elements in the received columns of the second matrix and rows of the first matrix in order to assemble the succession of the first and second vectors for input to the systolic array.

6. The apparatus according to claim 4, wherein the processing elements are arranged to compute and output an outer product of each pair of the matrices.

7. The apparatus according to claim 1, and comprising a random-access memory (RAM), which is coupled to receive and store the data values that are output successively from the accumulators in an output row of the systolic array over the sequence of processing cycles.

8. Computational apparatus, comprising:
a systolic array of processing elements arranged in a grid of rows and columns, each processing element comprising multipliers and accumulators configured such that in each of a sequence of processing cycles, the processing elements perform the following steps concurrently:
  the processing elements in a first row of the systolic array receive a first vector of first operands, such that each of the processing elements in the first row receives a respective first plurality of the first operands, while the processing elements in a first column of the systolic array receive a second vector of second operands, such that each of the processing elements in the first column receives a respective second plurality of the second operands;
  each processing element, except in the first row and first column, receives the respective first and second pluralities of the first and second operands from adjacent processing elements in a preceding row and column of the systolic array, respectively; and
  each processing element multiplies pairs of the first and second operands together to generate multiple respective products, and accumulates the products in the accumulators; and
synchronization logic, which is coupled to load a succession of the first and second vectors into the first row and first column of the systolic array, and upon completion of processing of the succession by the systolic array, to trigger the processing elements to transfer respective data values from the accumulators out of the systolic array,
wherein the accumulators in each processing element comprise first accumulators, in which the products are accumulated, and second accumulators,
wherein the processing elements are configured to pass stored output data values from the second accumulators to a succeeding processing element along a respective column of the systolic array, to receive new output data values from a preceding processing element along the respective column, and to store the new output data values in the second accumulators, and
wherein the synchronization logic is configured, upon completion of the processing of the succession of the first and second vectors by the systolic array, to trigger the processing elements to transfer the respective data values from the first accumulators to the second accumulators for output from the systolic array by transfer along the respective columns.

9. Computational apparatus, comprising:
a systolic array of processing elements arranged in a grid of rows and columns, each processing element comprising multipliers and accumulators configured such that in each of a sequence of processing cycles, the processing elements perform the following steps concurrently:
  the processing elements in a first row of the systolic array receive a first vector of first operands, such that each of the processing elements in the first row receives a respective first plurality of the first operands, while the processing elements in a first column of the systolic array receive a second vector of second operands, such that each of the processing elements in the first column receives a respective second plurality of the second operands;
  each processing element, except in the first row and first column, receives the respective first and second pluralities of the first and second operands from adjacent processing elements in a preceding row and column of the systolic array, respectively; and
  each processing element multiplies pairs of the first and second operands together to generate multiple respective products, and accumulates the products in the accumulators; and
synchronization logic, which is coupled to load a succession of the first and second vectors into the first row and first column of the systolic array, and upon completion of processing of the succession by the systolic array, to trigger the processing elements to transfer respective data values from the accumulators out of the systolic array,
wherein the accumulators in each processing element comprise first accumulators, in which the products are accumulated, and second accumulators,
wherein the processing elements are configured to pass stored output data values from the second accumulators to a succeeding processing element along a respective column of the systolic array, to receive new output data values from a preceding processing element along the respective column, and to store the new output data values in the second accumulators, and
wherein each of the second accumulators in each processing element is coupled to receive and transfer the respective data values that are accumulated in at least two of the first accumulators in the processing element.

10. Computational apparatus, comprising:

a systolic array of processing elements arranged in a grid of rows and columns, each processing element comprising multipliers and accumulators configured such that in each of a sequence of processing cycles, the processing elements perform the following steps concurrently:

the processing elements in a first row of the systolic array receive a first vector of first operands, such that each of the processing elements in the first row receives a respective first plurality of the first operands, while the processing elements in a first column of the systolic array receive a second vector of second operands, such that each of the processing elements in the first column receives a respective second plurality of the second operands;

each processing element, except in the first row and first column, receives the respective first and second pluralities of the first and second operands from adjacent processing elements in a preceding row and column of the systolic array, respectively; and each processing element multiplies pairs of the first and second operands together to generate multiple respective products, and accumulates the products in the accumulators; and synchronization logic, which is coupled to load a succession of the first and second vectors into the first row and first column of the systolic array, and upon completion of processing of the succession by the systolic array, to trigger the processing elements to transfer respective data values from the accumulators out of the systolic array, wherein the accumulators in each processing element comprise first accumulators, in which the products are accumulated, and second accumulators, wherein the processing elements are configured to pass stored output data values from the second accumulators to a succeeding processing element along a respective column of the systolic array, to receive new output data values from a preceding processing element along the respective column, and to store the new output data values in the second accumulators, and wherein each processing element comprises a respective register file, which comprises registers that serve as the first and second accumulators and comprises write and read ports for writing data to and reading data from the registers.

11. Computational apparatus, comprising:

a systolic array of processing elements arranged in a grid of rows and columns, each processing element comprising multipliers and accumulators configured such that in each of a sequence of processing cycles, the processing elements perform the following steps concurrently:

the processing elements in a first row of the systolic array receive a first vector of first operands, such that each of the processing elements in the first row receives a respective first plurality of the first operands, while the processing elements in a first column of the systolic array receive a second vector of second operands, such that each of the processing elements in the first column receives a respective second plurality of the second operands;

each processing element, except in the first row and first column, receives the respective first and second pluralities of the first and second operands from adjacent processing elements in a preceding row and column of the systolic array, respectively; and each processing element multiplies pairs of the first and second operands together to generate multiple respective products, and accumulates the products in the accumulators; and synchronization logic, which is coupled to load a succession of the first and second vectors into the first row and first column of the systolic array, and upon completion of processing of the succession by the systolic array, to trigger the processing elements to transfer respective data values from the accumulators out of the systolic array, wherein the first and second pluralities of the first and second operands each respectively comprise two of the first operands and two of the second operands, whereby four different pairs of the first and second operands are multiplied together by each processing element, and wherein each processing elements comprises four processing blocks, each of which comprises a respective multiplier and one or more of the accumulators and is configured to multiply and accumulate the products of one of the four different pairs of the first and second operands.

12. A method for computation, comprising:

providing a systolic array of processing elements arranged in a grid of rows and columns, each processing element comprising multipliers and accumulators;

in each of a sequence of processing cycles, performing the following steps concurrently:

receiving a first vector of first operands in a first row of the systolic array, such that each of the processing elements in the first row receives a respective first plurality of the first operands, and receiving a second vector of second operands in a first column of the systolic array, such that each of the processing elements in the first column receives a respective second plurality of the second operands;

receiving in each processing element, except in the first row and first column, the respective first and second pluralities of the first and second operands from adjacent processing elements in a preceding row and column of the systolic array, respectively; and multiplying pairs of the first and second operands together in the processing elements to generate multiple respective products, and accumulating the products in the accumulators;

loading a succession of the first and second vectors into the first row and column of the systolic array; and upon completion of processing of the succession by the systolic array, triggering the processing elements to transfer respective data values from the accumulators out of the systolic array, wherein triggering the processing elements causes the processing elements to pass the data values that were computed over a first succession of the first and second vectors along the columns of the systolic array for transfer out of the systolic array concurrently with processing the operands in a second succession of the first and second vectors and accumulating products of the operands in the accumulators.

13. The method according to claim 12, wherein the accumulators in each processing element comprise first accumulators, in which the products are accumulated, and second accumulators, wherein triggering the processing elements causes the processing elements to pass stored output data values from the second accumulators to a succeeding processing element along a respective column of the systolic array, to receive new output data values from a preceding processing element along the respective column, and to store the new output data values in the second accumulators.

14. The method according to claim 13, wherein triggering the processing elements comprises triggering the processing elements upon completion of the processing of the succession of the first and second vectors by the systolic array to transfer the respective data values from the first accumulators to the second accumulators for output from the systolic array by transfer along the respective columns.

15. The method according to claim 13, wherein each of the second accumulators in each processing element receives and transfers the respective data values that are accumulated in at least two of the first accumulators in the processing element.

16. The method according to claim 13, wherein each processing element comprises a respective register file, which comprises registers that serve as the first and second accumulators and comprises write and read ports for writing data to and reading data from the registers.

17. The method according to claim 12, wherein the first and second pluralities of the first and second operands each respectively comprise two of the first operands and two of the second operands, whereby four different pairs of the first and second operands are multiplied together by each processing.

18. The method according to claim 17, wherein each processing elements comprises four processing blocks, each of which comprises a respective multiplier and one or more of the accumulators and multiplies and accumulates the products of one of the four different pairs of the first and second operands.

19. The method according to claim 12, wherein each of the first and second successions of the first and second vectors comprises a respective pair of matrices to be multiplied together.

20. The method according to claim 19, wherein the pair of the matrices comprises a first matrix and a second matrix, and wherein loading the succession of the first and second vectors comprises receiving successive rows of the first matrix and columns of the second matrix from a memory and applying different, respective offsets to successive matrix elements in the received columns of the second matrix and rows of the first matrix in order to assemble the succession of the first and second vectors for input to the systolic array.

21. The method according to claim 19, wherein processing the succession of the first and second vectors comprises computing and outputting an outer product of each pair of the matrices.

22. The method according to claim 12, and comprising outputting the data values successively from the accumulators in an output row of the systolic array over the sequence of processing cycles to a random-access memory (RAM), and storing the data values in the RAM.

* * * * *